United States Patent [19]
Yatcilla

[11] 3,984,969
[45] Oct. 12, 1976

[54] BALER PICKUP COUNTERBALANCING MEANS

[75] Inventor: George E. Yatcilla, Newton, Kans.

[73] Assignee: Sperry Rand Corporation, New Holland, Pa.

[22] Filed: Sept. 15, 1975

[21] Appl. No.: 613,154

[52] U.S. Cl. .................................. 56/341; 56/364
[51] Int. Cl.² ........................................ A01D 39/00
[58] Field of Search ............................. 56/341–344, 56/364

[56] References Cited
UNITED STATES PATENTS

| | | | |
|---|---|---|---|
| 2,994,178 | 8/1961 | Hollyday | 56/344 |
| 3,483,688 | 12/1969 | Hollyday | 56/341 |
| 3,487,613 | 1/1970 | Hollyday | 56/341 X |
| 3,572,022 | 3/1971 | Smith | 56/341 |
| 3,684,026 | 8/1972 | Reuter et al. | 56/341 |
| 3,798,885 | 3/1974 | Glass et al. | 56/364 |

Primary Examiner—Russell R. Kinsey
Attorney, Agent, or Firm—John R. Flanagan; Frank A. Seemar; Michael R. Swartz

[57] ABSTRACT

A baler has a mobile frame adapted to move across a field, means on said frame operable to receive and form crop material into bales, a pickup assembly including pivot means on said frame and pickup means disposed generally forwardly of and swingably mounted to the pivot means and operable to pick up crop material from the field and feed it to the receiving and forming means, and improved means to counterbalance the pickup means. The improved counterbalance means includes a lever pivotally mounted at one end on said frame above the pickup means at a location spaced inwardly from one lateral side of the pickup means and extending generally parallel with the pickup means to an opposite end located generally above the one lateral side of the pickup means, a cable interconnecting the one lateral side of the pickup means with a lower portion of the opposite end of the lever and a pair of tension springs interconnecting an upper portion of the opposite end of the lever with the frame between the one end of the lever and an opposite end of the pickup means so as to substantially uniformily counterbalance a substantial portion of the weight of the pickup to enable the pickup means to flotatively follow the field contour.

12 Claims, 3 Drawing Figures

BALER PICKUP COUNTERBALANCING MEANS

BACKGROUND OF THE INVENTION

1. Field of the Invention

The present invention relates generally to a baler and, more particularly, is concerned with an improved system for counterbalancing the pickup of the baler.

2. Description of the Prior Art

The present invention provides a baler pickup counterbalancing system which constitutes an improvement over that disclosed and illustrated in U.S. Pat. No. 3,798,885 which issued Mar. 26, 1974 to Emmett F. Glass and Robert G. Young and is assigned to the same assignee as the present invention.

The prior art counterbalancing system disclosed in the aforesaid patent includes a relatively long low rate tension spring (or a pair of such springs connected in seres) disposed parallel to and above the baler pickup, a sheave rotatably supported on the baler above one end of the pickup and a cable and link assembly interconnecting the spring and the one end of the pickup. The cable is connected to one end of the spring and extends horizontally therefrom to and about the sheave and then extends downwardly to its connection with an upper end of the link. The link is pivotally connected at its lower end to the one end of the pickup such that the moment arm of the upward lifting force about the pickup pivot point will increase as the spring load decreases. In above-described system, the increasing moment arm is critical to the utilization of a low rate spring or springs in series.

While the prior art system has, in an overall sense, proven to be a satisfactory way to counterbalance the baler pickup, some disadvantages have been discovered.

One disadvantage relates to the frictional forces created between the cable and rotating sheave which tend to increase the load on the counterbalancing springs and thereby somewhat diminish their effectiveness in providing uniform floation of the pickup.

Another disadvantage is derived from the presence of these frictional forces, such being undesirable wear of the cable of sheave which shortens the useful life of these components necessitating frequent maintenance or replacement.

SUMMARY OF THE INVENTION

The improved system of the present invention for counterbalancing the baler pickup obviates the aforementioned disadvantages. Also, the improved system provides an arrangement which minimizes the criticality of the spring rate as well as the increasing moment arm of the lifting force about the pickup pivot point as heretofore was the case with the system disclosed in aforesaid U.S. Pat. No. 3,798,885 and at the same time, more nearly achieves uniform flotation of the pickup than heretofore.

Accordingly, the present invention relates to an improved means to counterbalance the pickup means of a baler. The baler has a mobile frame adapted to move across a field, means on the frame operable to receive crop material and form the material into bales and a pickup assembly including pivot means on the frame and pickup means disposed generally forwardly of the pivot means and operable to pick up crop material from the field and feed the material to the receiving and feeding means. The pickup means is connected to the pivot means for vertical swinging movement about the pivot means.

Preferably, the improved counterbalancing means includes a lever pivotally mounted on the frame for movement along a generally arcuate path about a generally horizontal pivot axis at a location above and spaced from one lateral side of the pickup means. The lever extends generally parallel with respect to the pickup means to another location generally above the one lateral side of the pickup means.

The improved means further includes an elongated means interconnecting the pickup means at its one lateral side with the lever at its another location and resilient means mounted on the frame above the pickup means and acting upon the lever with a predetermined magnitude of force adequate to counterbalance a substantial portion of the weight of the pickup through the lever and interconnecting means and thereby flotatively support the pickup means in an operating position above the field.

The resilient means is disposed in relation to the pivot axis of the lever such that, during upward swinging movement of the pickup means about the pivot means which results in generally upward movement of the lever along its arcuate path about its pivot axis, the moment arm of the counterbalancing force of the resilient means about the pivot axis of the lever increases as the magnitude of the counterbalancing force of the resilient means decreases which provides substantially uniform flotation of the weight of the pickup means as it follows the contour of the field during movement of the mobile frame across the field.

More particularly, the lever is in the form of a plate being disposed in a generally vertical plane and pivotally mounted at one end spaced inwardly from the one lateral side of the pickup means, with an opposite end of the plate being disposed generally above the one lateral side of the pickup means. The elongated interconnecting means is preferably a flexible structure, such as a cable or the like, and is connected to a lower portion of the opposite end of the plate so as to extend generally vertically between the pickup means and the plate in a generally tangential relationship to the arcuate path of movement of the plate. The resilient means in the form of at least one tension spring is connected at one end to an upper portion of the opposite end of the plate and extends above the pivot axis of the plate in a nearly perpendicular relationship to the arcuate path of movement of the plate. A bracket is fixed on the frame above the pickup means generally between the pivotal plate and an opposite lateral side of the pickup means. Means for adjusting the tension in the spring interconnects an opposite end of the spring and the bracket.

Also, the improved counterbalancing means may be provided in association with both of the opposite lateral sides of the pickup means, instead of just one of such sides as in the preferred form of the invention.

The advantages and attainments of the improvement provided by the present invention will become apparent to those skilled in the art upon a reading of the following detailed description when taken in conjunction with the drawings in which there is shown and described illustrative embodiments of the invention.

BRIEF DESCRIPTION OF THE DRAWINGS

In the course of the following detailed description reference will be frequently made to the attached drawings in which.

DETAILED DESCRIPTION OF THE INVENTION

In the following description, right hand and left hand references are determined by standing at the rear of the baler and facing in the direction of forward travel. Also, in the following description, it is to be understood that such terms as "forward", "rearward", "left", "upwardly," etc., are words of convenience and are not to be construed as limiting terms.

IN GENERAL

Figure 1:
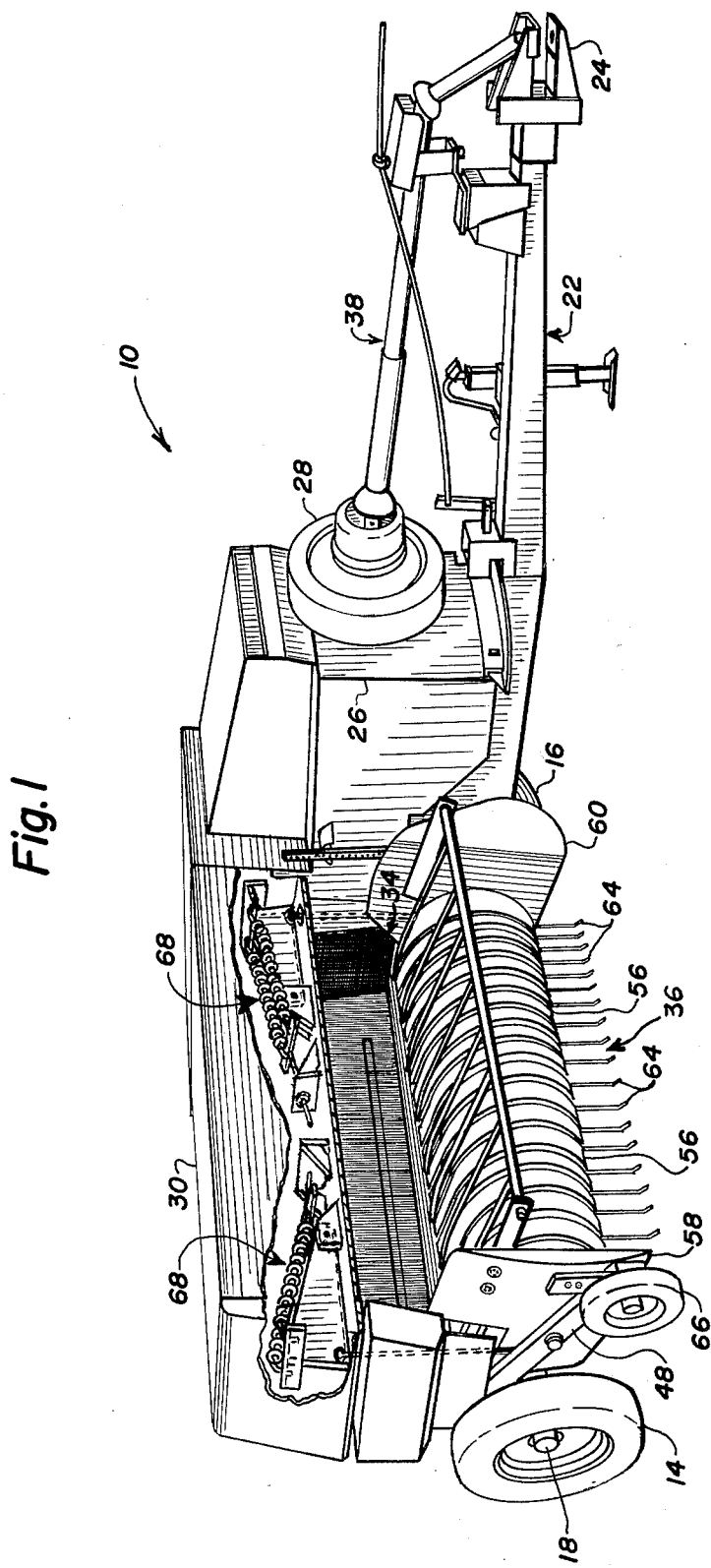
FIG. 1 is a perspective view of a baler with portions broken away and shown in section to illustrate a pair of the improved pickup counterbalancing means provided by the present invention.

Referring now to the drawings, and particularly to FIG. 1, there is shown a hay baler, being indicated generally by numeral 10. The baler 10 includes a frame 12 (partially seen in FIG. 2) supported and made mobile by right and left ground-engaging wheels 14,16 rotatably mounted on right and left spindles 18,20 being connected to and extending outwardly from respective opposite sides of the frame 12. The baler has a tongue 22, being pivotally connected to the frame 12 and extending forwardly of the baler. When articulately connected at a hitch end 24 of its tongue 22 to the drawbar of a tractor (not shown), the baler 10 may be towed across a field.

The baler 10 further includes a fore-and-aft extending bale case or chamber 26 on the frame 12 having a forward end on which a flywheel 28 is rotatably mounted, a feeder housing 30 transversely mounted on the frame 12 adjacent the right side of the bale chamber 26 within which is mounted a feeding mechanism 32 (FIG. 2) adapted to convey crop material into the bale chamber 26 through inlet opening 34, and a pickup assembly 36 mounted on the frame 12 forwardly of and below the feeder housing 30 and adapted to lift crop material from the field and deliver it to the feeding mechanism 32.

A plunger (not shown) is mounted for reciprocable movement in the bale chamber 26 for forming the crop material conveyed therein through inlet opening 34 into rectangular bales. As the bales are formed in the bale chamber 26, they move progressively toward the rear end of the bale chamber 26. After each bale is completed, it is banded with a suitable tying medium and, subsequently, emerges from the rear or discharge end of the bale chamber An input driveline, generally designated by numeral 38, being connected at its rear end to the baler flywheel 28, is adapted for connection at its forward end to the power takeoff (pto) shaft of the tractor (not shown) for rotation is unison therewith to supply rotary driving power to the operating components of the baler 10 through additional power transmitting components (not shown).

PICKUP ASSEMBLY

As mentioned above, disposed forwardly of and below the feeder housing 30 of the baler 10 is the pickup assembly indicated generally by numeral 36. The pickup assembly includes pivot means, indicated generally by 40, and pickup means indicated generally by 42.

The pivot means 40 includes a transversely extending tubular member 44 which is rotatably journalled to spaced apart, downwardly extending portions 46 (only the left one being seen in FIGS. 2 and 3) of the baler frame 12.

The pickup means 42 includes right and left channel members 48,50 which are secured at their respective rearward ends to the tubular member 44. A plurality of upwardly and downwardly extending pickup guard supports 52,54 are also secured at their rearward ends to the tubular member 44, the pickup guard supports being disposed in spaced apart relationship between the channel members 48,50. Spaced apart pickup guards 56 are secured to the forward portion of each of the upper and lower pickup guard supports 52,54. Right and left pickup side sheet members 58,60 are secured respectively to inner sides of the channel members 48,50.

A tubular shaft 62 extends transversely between, and is rotatably journalled at its opposite ends in the respective channel members 48,50 at locations generally intermediately between their rearward and forward ends, the tubular shaft 62 supporting in a conventional manner a plurality of pickup tines or finger 64 which are aligned so as to extend outwardly through respective spaces between pickup guards 56 during rotation of the shaft 62. The tubular shaft 62 is caused to be rotated, and thereby the fingers 64 moved, in a counterclockwise direction (as viewed in FIG. 2) by a generally conventional drive mechanism (not illustrated) which is one of the aforementioned power transmitting components supplied with rotary power from the baler driveline 38.

Figure 2:
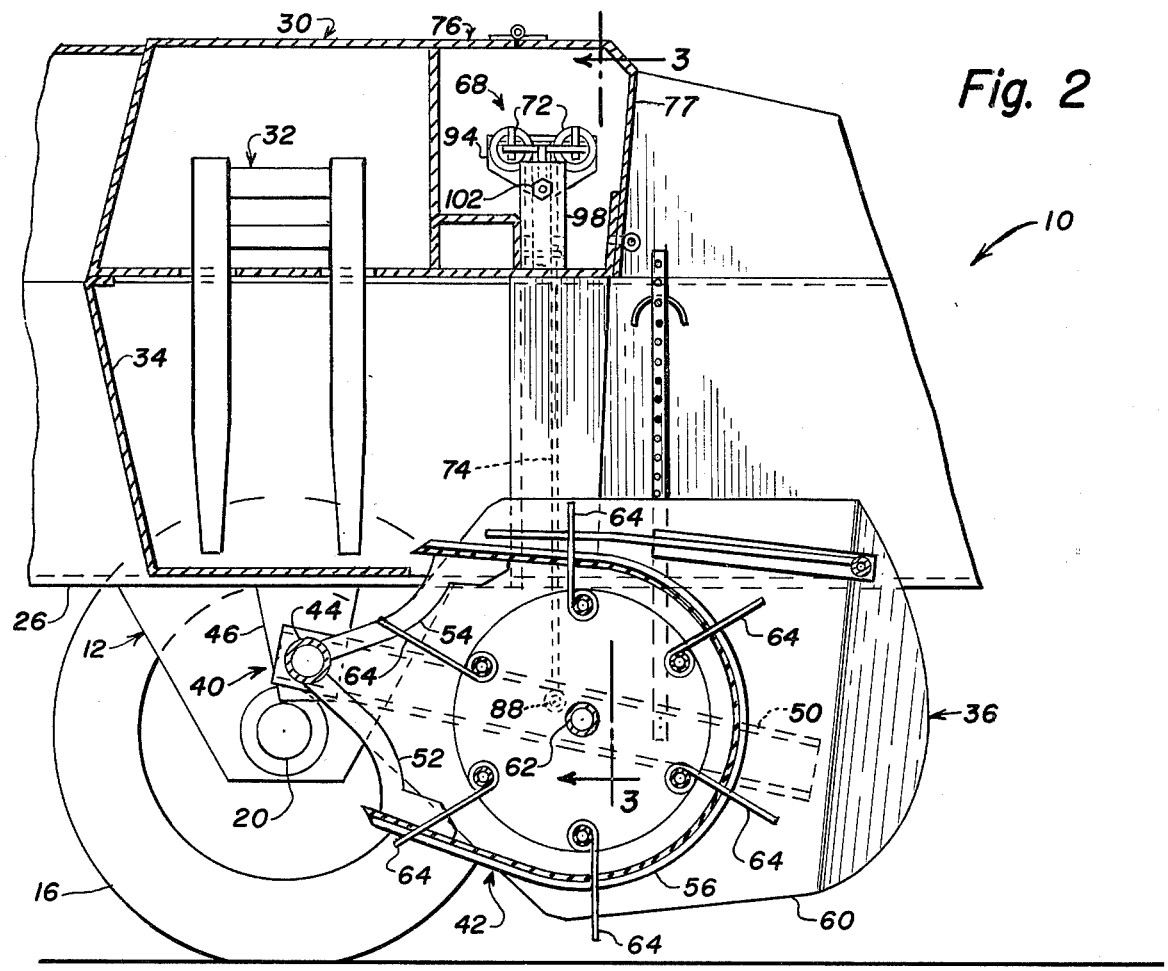
FIG. 2 is an enlarged, fragmentary side elevational view of the baler as seen from the middle of the baler pickup looking toward the left side of the baler, with some parts broken away and shown in section to illustrate an end view of the improved counterbalancing means in association with the left lateral side of the pickup as in the preferred form of the present invention.

In FIGS. 1 and 2, the pickup means 42 is shown in its lowered operating position for picking up crop material from the field and feeding it to the feeder housing 30, as the baler is towed across the field. In this position, the height of the pickup means 42 above the field is gauged by a ground-engaging wheel 66 which is adjustably supported by the right channel member 48.

As the baler 10 advances in a forward direction across the field, the moving pickup fingers 64 will engage crop material lying on the field and lift it upwardly and rearwardly toward the feeder housing 30 while the gauge wheel 66 will ride along the field causing the pickup means 42 to vertically swing as uneven surface contours are encountered by the baler 10. In order to prevent too much force from being imposed upon the gauge wheel 66, it has been conventional practice to counterbalance a substantial portion of the weight of the pickup means 42.

IMPROVED PICKUP COUNTERBALANCING MEANS

Figure 3:
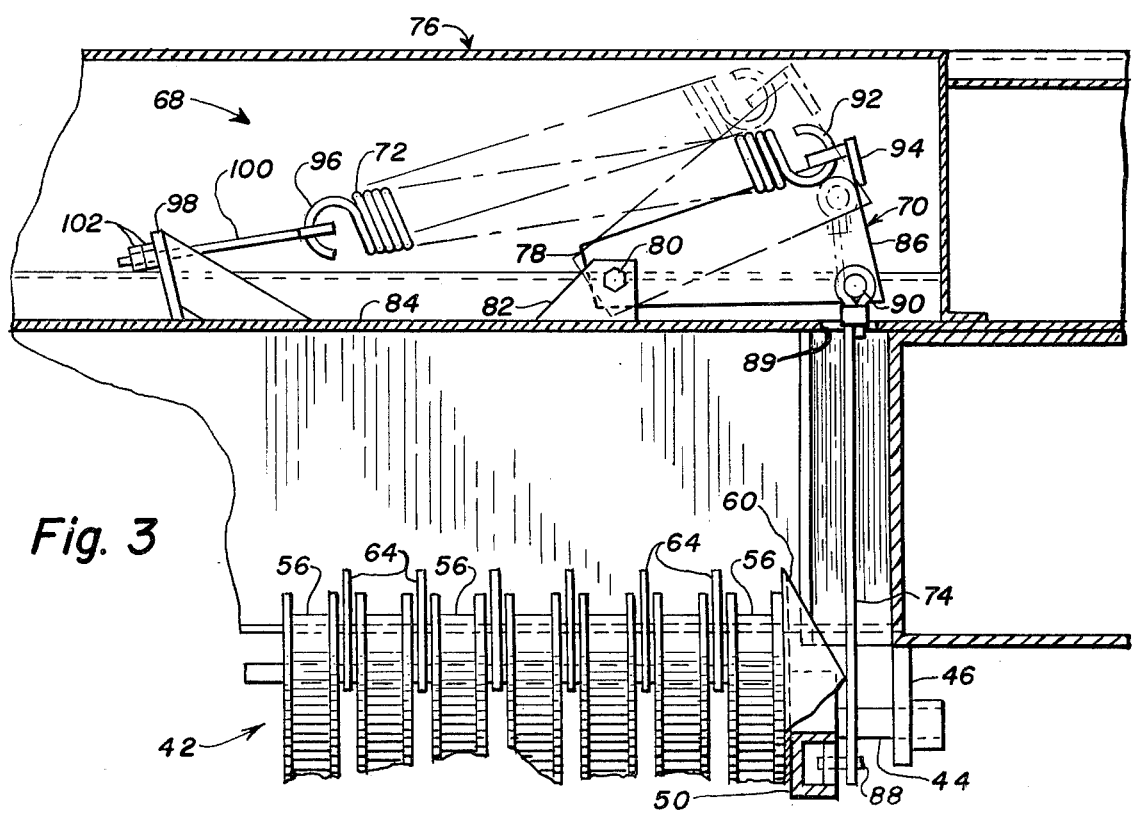
FIG. 3 is a fragmentary front elevational view taken along line 3—3 of FIG. 2, but on a somewhat larger scale that that of FIG. 2, of the improved counterbalancing means.

The improved counterbalancing means provided by the present invention, being generally designated as 68, is preferably located in association with the left lateral side of the pickup means 42, as seen in FIGS. 2 and 3. However, it may alternatively be associated with the right lateral side of the pickup means 42, or a pair of such improved means may be incorporated into a baler in association with both lateral sides of the pickup means 42, such as seen in FIG. 1.

The improved counterbalancing means 68 is basically comprised by a pivotal lever 70, resilient means in the form of at least one spring and, preferably, a pair of springs 72, and interconnecting means in the form of a cable 74 or the like, such as a chain or a rigid link.

The lever 70 and springs 72 are disposed within a transverse housing 76 of the baler frame 12 located forwardly of the feeder housing 30 and above the pickup assembly 36. The housing 76 has a front cover 77 which may be opened for gaining access to the interior of the housing 76. Specifically, the lever 70 is in the form of a plate being disposed in a generally vertical plane and pivotally mounted at one end 78 by element 80 to an upstanding tab 82 fixed to the floor 84 of the housing 76 and spaced inwardly from the left lateral side of the pickup means 42 as seen in FIG. 3. The lever 70 may, therefore, be pivoted along a generally vertical arcuate path, such as between its lower solid line position and its upper broken line position illustrated in FIG. 3. The lever 70 extends generally parallel with respect to the pickup means 42 and has an opposite end 86 being located generally above the one lateral side of the pickup means 42. Preferably, the opposite end 86 of the lever 70 has a greater height than its one end 78.

The cable 74 at its lower end is coupled by a pin 88 to the left channel member 50 of the pickup means 42 adjacent the left end of tubular shaft 62 and proximate the center of gravity of the pickup means 42. The cable 74 extends generally vertically through an opening 89 in the housing floor 84 to its upper end which is coupled by a fastener 90 to a lower portion of the opposite end 86 of the pivotal lever 70 which is generally horizontally aligned with the pivot axis of the lever 70 defined by element 80, as seen in FIG. 3. In such alignment, it will be noted that the cable 74 extends in a generally tangential relationship to the arcuate path of movement of the pivotal lever 70. While a flexible cable 74 is disclosed in the preferred form of the counterbalancing means 68, it should be understood that any other suitable article may be used, such as a flexible chain, a rigid link etc.

The springs 72 are respectively connected at their outer or left ends 92 to opposite ends of a bracket 94 transversely fixed on an upper portion of the opposite end 86 of the pivotal lever 70. At their right ends 96, the springs 72 are respectively interconnected to an upstanding anchor member 98 fixed on the housing floor 84 between the tab 82 and the opposite or right lateral side of the pickup means 42. An adjustable T-shaped bolt 100 is utilized to interconnect the spring ends 96 to the anchor 98. By tightening the nuts 102 further onto the end of the bolt 100 the tension, and hence the magnitude of the counterbalancing force, provided by the springs 72 may be increased. It will be noted in viewing FIG. 3, that the springs 72 are spaced above the pivot axis of lever 70 and extend in a transverse or nearly perpendicular relationship to the arcuate path of movement of the lever 70.

Because of the respective positional relationships of the springs 72 and the cable 74 to the pivot axis of the lever 70, the pickup means 42 can vertically move through a distance which has a substantially greater length than the length of deflection of springs 72. Also, during upward swinging movement of the pickup means 42 about its pivotal axis which results in generally upward movement of the lever 70 from its lower position toward its upper position, the moment arm of the counterbalancing force of the spring 72 about the pivot axis of the lever 70 increases as the magnitude of the counterbalancing force decreases. Therefore, the above-described positional relationship of the springs 72 to the lever pivot axis and arcuate path of movement allows the springs to provide a substantially uniform torque about the lever pivot axis and thus substantially uniform flotation of a substantial portion of the weight of the pickup means 42 as it follows the contour of the field during movement of the baler 10 across the field.

It will be readily apparent that the improved counterbalancing means 68 of the present invention substantially eliminates the frictional forces heretofore created due to rotation of the sheave and contact between the rotatable sheave and the cable of the earlier-described prior art structure, the only frictional force created by the improved arrangement being at the element 80 about which the lever 70 pivots. It will be understood that the friction created at such location will be minimal through use of suitable bearing means.

It is thought that the invention and many of its attendant advantages will be understood from the foregoing description and it will be apparent that various changes may be made in the form, construction and arrangement of the parts described without departing from the spirit and scope of the invention or sacrificing all of its material advantages, the form hereinbefore described being merely an exemplary embodiment thereof.

Having thus described the invention, what is claimed is:

1. In a baler having a mobile frame adapted to move across a field, means on said frame operable to receive crop material and form said material into bales and a pickup assembly including pivot means on said frame and pickup means disposed generally forwardly of said pivot means and operable to pick up crop material from the field and feed said material to said receiving and forming means, said pickup means being connected to said pivot means for vertical swinging movement about a generally horizontal axis defined by said pivot means, an improved means to counterbalance said pickup means comprising:

a lever pivotally mounted at one end on said frame above said pickup means at a location spaced inwardly from one lateral side of said pickup means and extending generally parallel with said pickup means to an opposite end located generally above said one lateral side of said pickup means;

elongated, generally vertically-extending means interconnecting said pickup means at said one lateral side thereof with said lever at a lower portion of said opposite end thereof; and resilient means extending in generally transverse relationship to said interconnecting means above said one end of said lever and interconnecting said lever at an upper portion of said opposite end thereof with said frame between said one end of said lever and an opposite end of said pickup means so as to substantially uniformily counterbalance a substantial portion of the weight of said pickup means to enable said pickup means to flotatively follow the contour of the field during movement of said mobile frame across the field.

2. The baler as recited in claim 1, wherein said elongated interconnecting means comprises a flexible structure, such as a cable or the like.

3. The baler as recited in claim 1, wherein:
said lever is pivotal along a generally vertical arcuate path;
said interconnecting means extends in a generally tangential relationship to said arcuate path of movement of said lever; and
said resilient means extends in a generally transverse relationship to said arcuate path of movement of said lever.

4. The baler as recited in claim 1, wherein said resilient means comprises a pair of parallel, elongated tension springs.

5. The baler as recited in claim 4, wherein:
a bracket is fixed on said frame above said pickup means generally between said lever and said opposite lateral side of said pickup means; and
means for adjusting the tension in said springs, said adjusting means interconnecting said springs and said bracket.

6. In a baler having a mobile frame adapted to move across a field, means on said frame operable to receive crop material and form said material into bales and a pickup assembly including pivot means on said frame and pickup means disposed generally forwardly of said pivot means and operable to pick up crop material from the field and feed said material to said receiving and forming means, said pickup means being connected to said pivot means for vertical swinging movement about a generally horizontal axis defined by said pivot means, an improved means to counterbalance said pickup means comprising:
a lever pivotally mounted on said frame for movement along a generally arcuate path about a generally horizontal pivot axis at a location above and spaced from one lateral side of said pickup means, said lever extending generally parallel with respect to said pickup means to another location generally above said one lateral side of said pickup means;
elongated means interconnecting said pickup means at said one lateral side thereof with said lever at said another location thereof; and
resilient means mounted on said frame above said pickup means and acting upon said lever with a predetermined magnitude of force adequate to counterbalance a substantial portion of the weight of said pickup means through said lever and said elongated interconnecting means and thereby flotatively support said pickup means in an operating position above the field, said resilient means being disposed in relation to said pivot axis of said lever such that, during upward swinging movement of said pickup means about said pivot means which results in generally upward movement of said lever along its arcuate path about said pivot axis, the moment arm of said counterbalancing force of said resilient means about said pivot axis of said lever increases as the magnitude of said counterbalancing force of said resilient means decreases which provides substantially uniform flotation of the weight of said pickup means as it follows the contour of the field during movement of said mobile frame across the field.

7. The baler as recited in claim 6, wherein:
said elongated interconnecting means extends generally vertically between said lever and said pickup means in a generally tangential relationship to said arcuate path of movement of said lever; and
said resilient means extends in a transverse relationship to said arcuate path of movement of said lever.

8. The baler as recited in claim 6, wherein said lever is in the form of a plate being disposed in a generally vertical plane and pivotally mounted at one end spaced inwardly from said one lateral side of said pickup means, an opposite end of said plate being disposed generally above said lateral side of said pickup means.

9. The baler as recited in claim 8, wherein:
said elongated interconnecting means is connected to a lower portion of said opposite end of said plate and extends generally vertically between said plate and said pickup means is a generally tangential relationship to said arcuate path of movement of said plate; and
said resilient means is connected to an upper portion of said opposite end of said plate and extends above said pivot axis of said plate in a transverse relationship to said arcuate path of movement of said plate.

10. The baler as recited in claim 6, wherein said elongated interconnecting means comprises a flexible structure, such as a cable or the like.

11. The baler as recited in claim 6, wherein:
said resilient means comprises at least one elongated tension spring.

12. The baler as recited in claim 11, wherein:
a bracket is fixed on said frame above said pickup means generally between said lever and an opposite lateral side of said pickup means; and
means for adjusting the tension in said spring, said adjusting means interconnecting an end of said spring and said bracket.

* * * * *